(12) United States Patent
Orhan

(10) Patent No.: US 12,706,949 B2
(45) Date of Patent: Aug. 11, 2026

(54) PHISHING WEBSITE DETECTION BY CHECKING FORM DIFFERENCES FOLLOWED BY FALSE CREDENTIALS SUBMISSION

(71) Applicant: NuRD LLC, Bloomfield, NJ (US)

(72) Inventor: Fatih Orhan, Cedar Grove, NJ (US)

( * ) Notice: Subject to any disclaimer, the term of this patent is extended or adjusted under 35 U.S.C. 154(b) by 0 days.

(21) Appl. No.: 17/675,955

(22) Filed: Feb. 18, 2022

(65) Prior Publication Data

US 2022/0247782 A1 Aug. 4, 2022

Related U.S. Application Data

(63) Continuation of application No. 16/544,865, filed on Aug. 19, 2019, now Pat. No. 11,297,101.

(60) Provisional application No. 62/721,520, filed on Aug. 22, 2018.

(51) Int. Cl.
*H04L 9/40* (2022.01)

(52) U.S. Cl.
CPC ...... *H04L 63/1483* (2013.01); *H04L 63/1416* (2013.01)

(58) Field of Classification Search
CPC ........................ H04L 63/1483; H04L 63/1416
USPC ........................................................... 726/23
See application file for complete search history.

(56) References Cited

U.S. PATENT DOCUMENTS 7,634,810 B2 12/2009 Goodman et al.
7,854,001 B1 12/2010 Chen et al.
7,925,883 B2 4/2011 Florencio et al.
8,220,047 B1 * 7/2012 Soghoian .............. H04L 51/214 709/227
8,566,938 B1 10/2013 Prakash et al.
9,027,126 B2 5/2015 Larkins
9,230,105 B1 * 1/2016 Satish ..................... G06F 21/56
9,578,048 B1 * 2/2017 Hunt .................. H04L 63/1416
9,843,602 B2 12/2017 Tsao et al.
(Continued)

FOREIGN PATENT DOCUMENTS

CN 102724186 A * 10/2012
CN 102932348 A * 2/2013
(Continued)

OTHER PUBLICATIONS

Ndibwile et al., "UnPhishMe: Phishing Attack Detection by Deceptive Login Simulation through an Android Mobile App," 2017 12th Asia Joint Conference on Information Security (AsiaJCIS), 2017, pp. 38-47, doi: 10.1109/AsiaJCIS.2017.19. (Year: 2017).*
(Continued)

*Primary Examiner* — Peter C Shaw
(74) *Attorney, Agent, or Firm* — Joseph P. Aiena

(57) ABSTRACT

There is provided a method to detect phishing websites so as to protect users from sending their sensitive information to criminal servers. When browsing a web site having an input form asking sensitive information, the input fields are recorded (i.e. username field and password field). Then false credentials are generated and submitted in background. The new control layer then checks the response page content whether it includes an input form and if there is an input, it checks whether the form has the same fields as the first form. If the responded page does not have a form, or it has a form but includes different fields than the initial page's form, then the original site is identified as phishing.

2 Claims, 6 Drawing Sheets

(56) References Cited

U.S. PATENT DOCUMENTS

| | | | | |
|---|---|---|---|---|
| 10,652,277 | B1 * | 5/2020 | Venkatesan | G06F 40/14 |
| 2006/0080735 | A1 | 4/2006 | Brinson et al. | |
| 2007/0250920 | A1 * | 10/2007 | Lindsay | G06F 21/31 726/7 |
| 2008/0046738 | A1 * | 2/2008 | Galloway | H04L 63/1416 713/176 |
| 2008/0092242 | A1 * | 4/2008 | Rowley | H04L 63/1483 726/27 |
| 2009/0006861 | A1 * | 1/2009 | Bemmel | H04L 63/083 713/189 |
| 2009/0228780 | A1 * | 9/2009 | McGeehan | G06F 21/55 726/4 |
| 2010/0175136 | A1 | 7/2010 | Frumer et al. | |
| 2011/0126289 | A1 | 5/2011 | Yue et al. | |
| 2013/0333038 | A1 * | 12/2013 | Chien | H04L 63/1408 726/23 |
| 2014/0359760 | A1 * | 12/2014 | Gupta | H04L 63/1483 726/22 |
| 2015/0058986 | A1 * | 2/2015 | Zhao | H04L 63/1441 709/225 |
| 2015/0074390 | A1 * | 3/2015 | Stoback | H04L 63/1483 713/156 |
| 2017/0099319 | A1 | 4/2017 | Hunt et al. | |
| 2017/0244755 | A1 * | 8/2017 | Tsao | H04L 63/083 |
| 2018/0007066 | A1 | 1/2018 | Goutal | |
| 2018/0077199 | A1 * | 3/2018 | Tsao | G06F 21/44 |
| 2019/0068638 | A1 * | 2/2019 | Bartik | H04L 63/1483 |
| 2020/0204587 | A1 * | 6/2020 | Hunt | G06F 21/128 |
| 2021/0160280 | A1 * | 5/2021 | Yadav | G06F 18/24137 |
| 2021/0314353 | A1 * | 10/2021 | Melson | H04L 67/02 |

FOREIGN PATENT DOCUMENTS

| | | | | |
|---|---|---|---|---|
| KR | 20080111310 A | * | 12/2008 | H04L 63/1483 |
| WO | WO-2015000422 A1 | * | 1/2015 | H04L 63/1483 |

OTHER PUBLICATIONS

Faris et al., "Phishing Web Page Detection Methods: URL and HTML Features Detection," 2020 IEEE International Conference on Internet of Things and Intelligence System (IoTaIS), BALI, Indonesia, 2021, pp. 167-171, doi: 10.1109/IoTaIS50849.2021.9359694. (Year: 2020).*

Ndibwile et al., "UnPhishMe: Phishing Attack Detection by Deceptive Login Simulation through an Android Mobile App," 2017 12th Asia Joint Conference on Information Security (AsiaJCIS), Seoul, Korea (South), 2017, pp. 38-47, doi: 10.1109/AsiaJCIS.2017.19. (Year: 2017).*

Barraclough et al., "Online phishing detection toolbar for transactions," 2015 Science and Information Conference (SAI), London, UK, 2015, pp. 1321-1328, doi: 10.1109/SAI.2015.7237314. (Year: 2015).*

Armano et al., "Real-Time Client-Side Phishing Prevention Add-On," 2016 IEEE 36th International Conference on Distributed Computing Systems (ICDCS), Nara, Japan, 2016, pp. 777-778, doi: 10.1109/ICDCS.2016.44. (Year: 2016).*

Ahmed et al., "Real time detection of phishing websites," 2016 IEEE 7th Annual Information Technology, Electronics and Mobile Communication Conference (IEMCON), Vancouver, BC, Canada, 2016, pp. 1-6, doi: 10.1109/IEMCON.2016.7746247. (Year: 2016).*

Adil et al., "Preventive Techniques of Phishing Attacks in Networks," 2020 3rd International Conference on Advancements in Computational Sciences (ICACS), Lahore, Pakistan, 2020, pp. 1-8, doi: 10.1109/ICACS47775.2020.9055943. (Year: 2020).*

Shahriar et al., "Information Source-Based Classification of Automatic Phishing Website Detectors," 2011 IEEE/IPSJ International Symposium on Applications and the Internet, Munich, Germany, 2011, pp. 190-195, doi: 10.1109/SAINT.2011.34. (Year: 2011).*

Yue et al., "Anti-Phishing in Offense and Defense," 2008 Annual Computer Security Applications Conference (ACSAC), Anaheim, CA, USA, 2008, pp. 345-354, doi: 10.1109/ACSAC.2008.32. (Year: 2008).*

Shahriar et al., "PhishTester: Automatic Testing of Phishing Attacks," 2010 Fourth International Conference on Secure Software Integration and Reliability Improvement, Singapore, 2010, pp. 198-207, doi: 10.1109/SSIRI.2010.17. (Year: 2010).*

Churi et al., "A secured methodology for anti-phishing," 2017 International Conference on Innovations in Information, Embedded and Communication Systems (ICIIECS), Coimbatore, India, 2017, pp. 1-4, doi: 10.1109/ICIIECS.2017.8276081. (Year: 2017).*

Kalangi et al., "Phishing Attack Detection using Collaborative Learning Approach at Dynamic Cloud Platform," 2023 Global Conference on Information Technologies and Communications (GCITC), Bangalore, India, 2023, pp. 1-6, doi: 10.1109/GCITC60406.2023.10426616. (Year: 2023).*

K. Kumar and K. Alekhya, "Detecting Phishing Websites Using Fuzzy Logic," International Journal of Advanced Research in Computer Engineering & Technology (IJARCET), vol. 5, Issue 10, Oct. 2016.

M. Aburrous, et al., "Intelligent Detection System for E-Banking Phishing Websites Using Fuzzy Data Mining," Expert Systems With Applications 37, pp. 7913-7921, 2010.

L. Wenyin, et al., "Phishing Web Page Detection," Document Analysis and Recognition, 2005.

S. Afroz and R. Greenstadt, "Phizhzoo: An Automated Web Phishing Detection Approach Based on Profiling and Fuzzy Matching," Drexel University, Tech. Rep., Mar. 2009.

S. Abu-Nimeh, et al., "A Comparison of Machine Learning Techniques for Phishing Detection," Proceedings of the Anti-Phishing Working Groups 2nd Annual eCrime Researches Summit, pp. 60-69, Oct. 2007.

A. Jain and V. Richariya, "Implementing a Web Browser With Phishing Detection Techniques," World of Computer Science and Information Technology Journal (WCSIT), vol. 1, No. 7, 289-291, 2011.

A. Bergholz, et al., Improved Phishing Detection Using Model-Based Features. In CEAS, 2008.

G. Ehringer and P. A. Barrachlough, "Intelligent Security for Phishing Online Using Adaptive Neuro Fuzzy Systems," (IJACSA), International Journal of Advanced Computer Science and Applications, vol. 8, No. 6, 2017.

Gajek S., Sadeghi AR. (2008) A Forensic Framework for Tracing Phishers. In: Fischer-Hubner S., Duquenoy P., Zuccato A., Martucci L. (eds.) The Future of Identity in the Information Society. Privacy and Identity 2007. IFIP—The International Federation for Information Processing, vol. 262. Springer, Boston MA.

H. Shahriar and M. Zulkernine, "PhishTester: Automatic Testing of Phishing Attacks," 2010 Fourth International Conference on Secure Software Integration and Reliability Improvement, 2010, pp. 198-207, doi:10.1109/SSIRI.2010.17.

* cited by examiner

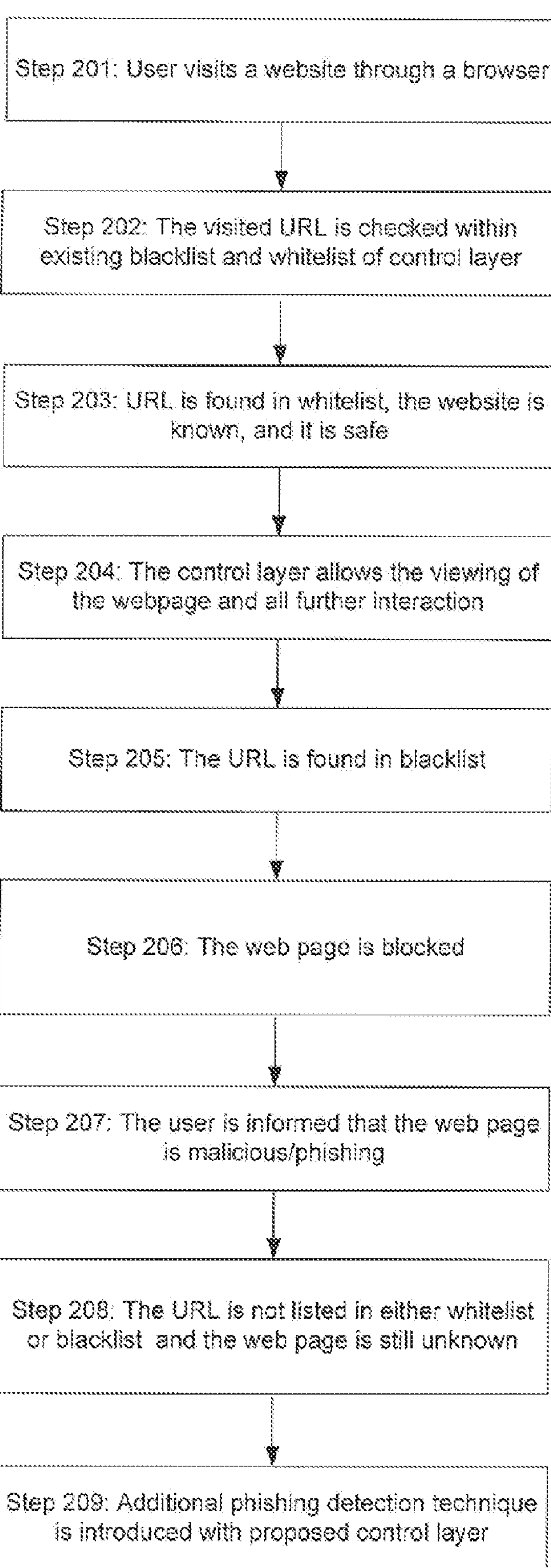
FIG. 2
Step 201: User visits a website through a browser
Step 202: The visited URL is checked within existing blacklist and whitelist of control layer
Step 203: URL is found in whitelist, the website is known, and it is safe
Step 204: The control layer allows the viewing of the webpage and all further interaction
Step 205: The URL is found in blacklist
Step 206: The web page is blocked
Step 207: The user is informed that the web page is malicious/phishing
Step 208: The URL is not listed in either whitelist or blacklist and the web page is still unknown
Step 209: Additional phishing detection technique is introduced with proposed control layer

FIG. 3A

Step 301: User visits an unknown webpage

Step 302: Control layer checks if there is a form in the web page

Step 303: Unknown webpage has no input form

Step 304: The control layer allows user to interact with the web page and does not block it Step 305: The form is found in the web page Step 306: The control layer extracts fields from presented form Step 307: Random credentials are being generated for field1 and field2 and form is submitted in background using these random data Step 308: The content of response page is analyzed in background Step 309: Response page has no input form Step 310: Control layer marks unknown web page as phishing and blocks it Step 311: Control layer warns user about phishing content detection Step 312: Control layer allows user to continue using the web site or stop interaction with it Step 313: Control layer extracts fields from form presented in response page Step 314: Control layer controls whether extracted form fields are the same with initial form fields Step 315: Form has different fields than tan the original form Step 316: Control layer marks unknown web page as phishing and blocks it Step 317: Control layer warns user about phishing content detection Step 318: Control layer allows user to continue using the web site or stop interaction with it Step 319: Form has the same fields with the original form Step 320: Control layer allows user to interact with the web page and does not block it User browses
Unknown page
Is there a form in the page?
Extract from fields
field 1, field 2
Submit fake values for fields
Analyze second page
Is there a form in the page?
NO
field 3, field 4
Extract from fields
Is field1==field3 && Field2==field4
YES
NO
YES
Not phishing
Phishing

FIG. 3C

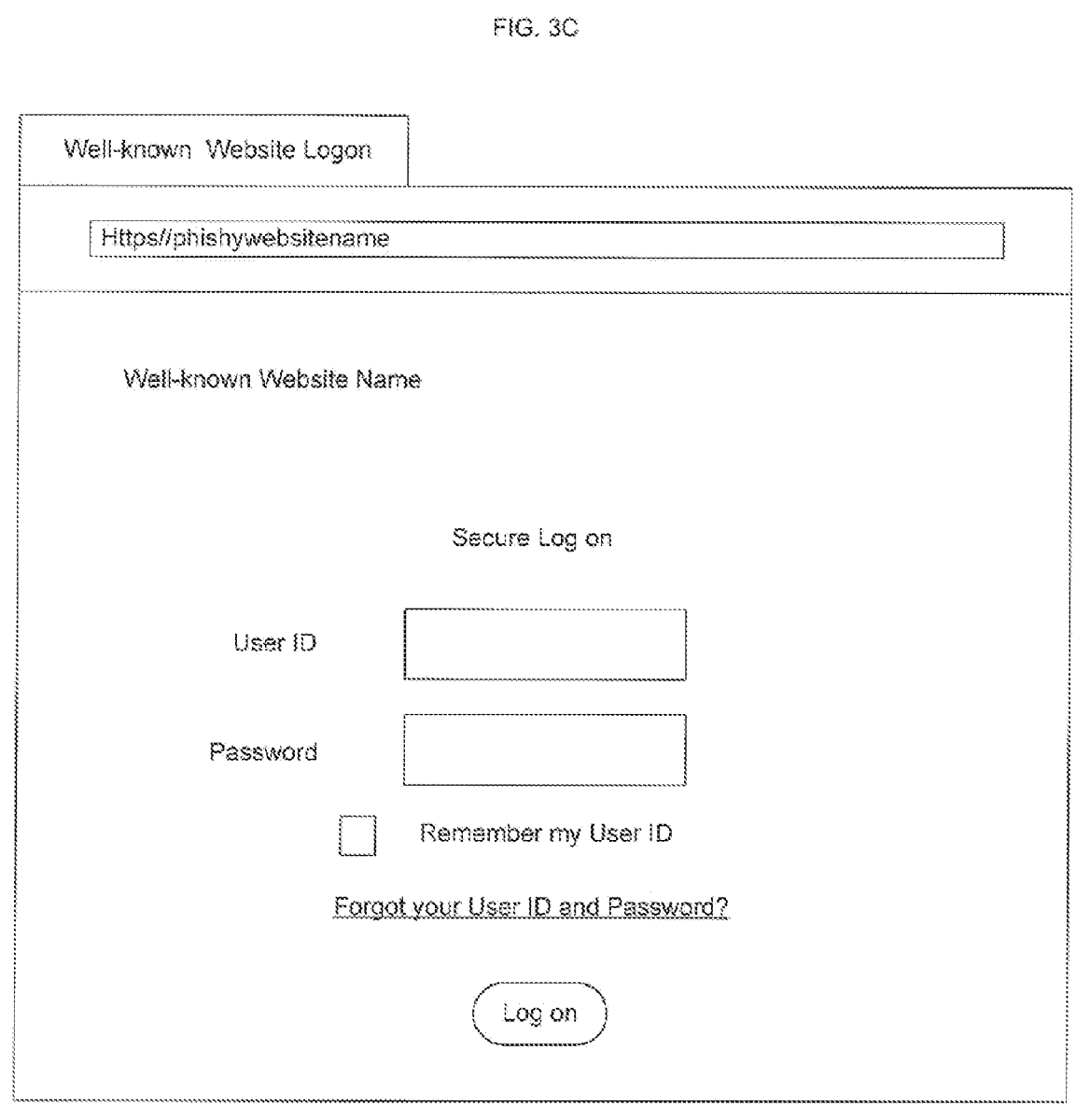

Well-known Website Logon

Https//phishywebsitename

Well-known Website Name

Secure Log on

User ID

Password

Remember my User ID

Forgot your User ID and Password?

Log on

FIG. 3D

Bitcoin Wallet - Well-known Website

Https//bitckchain.pw/wallet/#/login

Well-known Website Name

Welcome Back!

Or Sign up

Sign in to your wallet below

Wallet ID

Password

LOG IN

Log in via Mobile

Having some trouble? View Options

PHISHING WEBSITE DETECTION BY CHECKING FORM DIFFERENCES FOLLOWED BY FALSE CREDENTIALS SUBMISSION

CROSS REFERENCE TO RELATED APPLICATIONS

This application claims the benefit of and priority to U.S. patent application Ser. No. 16/554,865, filed on Aug. 19, 2019, which claims the benefit of and priority to U.S. Provisional Patent Application No. 62/721,520, filed on Aug. 22, 2018, each of which are incorporated by reference herein in their entirety.

BACKGROUND

Phishing is performed in many different ways and one of the major targets of this act is to steal user's sensitive information. The simple scenario for this malicious act is like: a phishing website pretends to be a reputable web site and requests sensitive information from the user (email, username & password, credit card information, SSN number etc.) The user provides the requested information and submits it, without knowing the site is fake. The user sensitive data is sent to criminals and information is utilized for malicious purposes.

Current techniques to detect phishing web pages are using several features of web pages such as URL syntax, DOM tree layout similarity, JavaScript codes, page style, domain identity, etc. There are also other methods that use features from email messages that contain URL itself and try to classify URL according to features extracted from email.

There are also methods that use whitelisting and blacklisting based approaches to detect phishing sites. These lists of malicious and safe web sites are being generated with either human validation or using simple rules, and when a web site is found in phishing blacklist, it is immediately marked as phishing and blocked by any protection component.

Disadvantage of blacklisting and whitelisting approach is its lack of zero-day phishing detection capability. When user browses a web page that is not either in blacklist or in whitelist, these techniques are unable to provide a classification result to user, and if this unknown web page is phishing it misses the detection. Other heuristic techniques have no interaction with the unknown page and use only static features of it trying to use similarity properties and various anomalies to classify unknown pages. This approach has potential to detect phishing pages up to some point though it is unable to catch and analyze behavior of unknown site according to user actions.

Thus there is need in new method for thorough and effective detection of phishing web sites before user submits sensitive information to malicious third parties.

SUMMARY OF THE INVENTION

The current invention is a method to detect phishing websites so to protect users from sending their sensitive information to criminal servers.

According to the present invention, when user browses a web site having an input form asking sensitive information, the input fields are being recorded (i.e. username field and password field). Then false credentials are being generated and submitted in background. Afterwards the new layer checks the response page content, whether it includes an input form and if there is an input, it checks whether the form has the same fields as the first form. If the responded page does not have a form, or it has a form but includes different fields than the initial page's form, then the original site is identified as phishing.

Invention method triggers interaction with web page and analyzes its behavior before actual real user interaction. This allows more enhanced phishing site detection, compared to existing techniques, that is capable to detect zero-day phishing web pages. This way the users are protected from these phishing websites and their sensitive data are not submitted to criminals' servers.

The system would limit the user when a website is not in whitelist but actually is not a phishing website and legit in all means. Since the proposed layer sends fake/random data to the legit website, the usability is affected. To overcome this, the users are enabled with a permissive functionality having "Allow this website" button after the fake data have been submitted once. That usability is helpful if users would want to be protected than to be sorry.

Nowadays every web browser has its own browser extension capability and lets developers to develop and publish any kind of browser extension. Proposed method is ideal to implement as a web browser extension and usable in real time while users are browsing any web page. It is possible to interact with web page's input forms in background and analyze response content invisible for user.

BRIEF DESCRIPTION OF DRAWINGS

FIG. 2 is a flowchart of one embodiment of the invention where initial phishing detection steps are taking place.

FIG. 3A is a flowchart of another embodiment of the invention where the proposed control layer detects whether visited web page is phishing or not in real-time.

FIG. 3C is a depiction of another embodiment of the invention where submit form example is shown.

FIG. 3D is a depiction of another embodiment of the invention where submit form example is shown.

DETAILED DESCRIPTION

The present invention discloses the method of phishing website detection by checking form differences followed by false credentials submission. The detection is implemented by introducing a control layer between the user and the website to be visited, so that proposed new layer can check whether the page requiring sensitive information is a phishing web site by comparing the initial page with input form and the response page after false credential submission.

Figure 1:
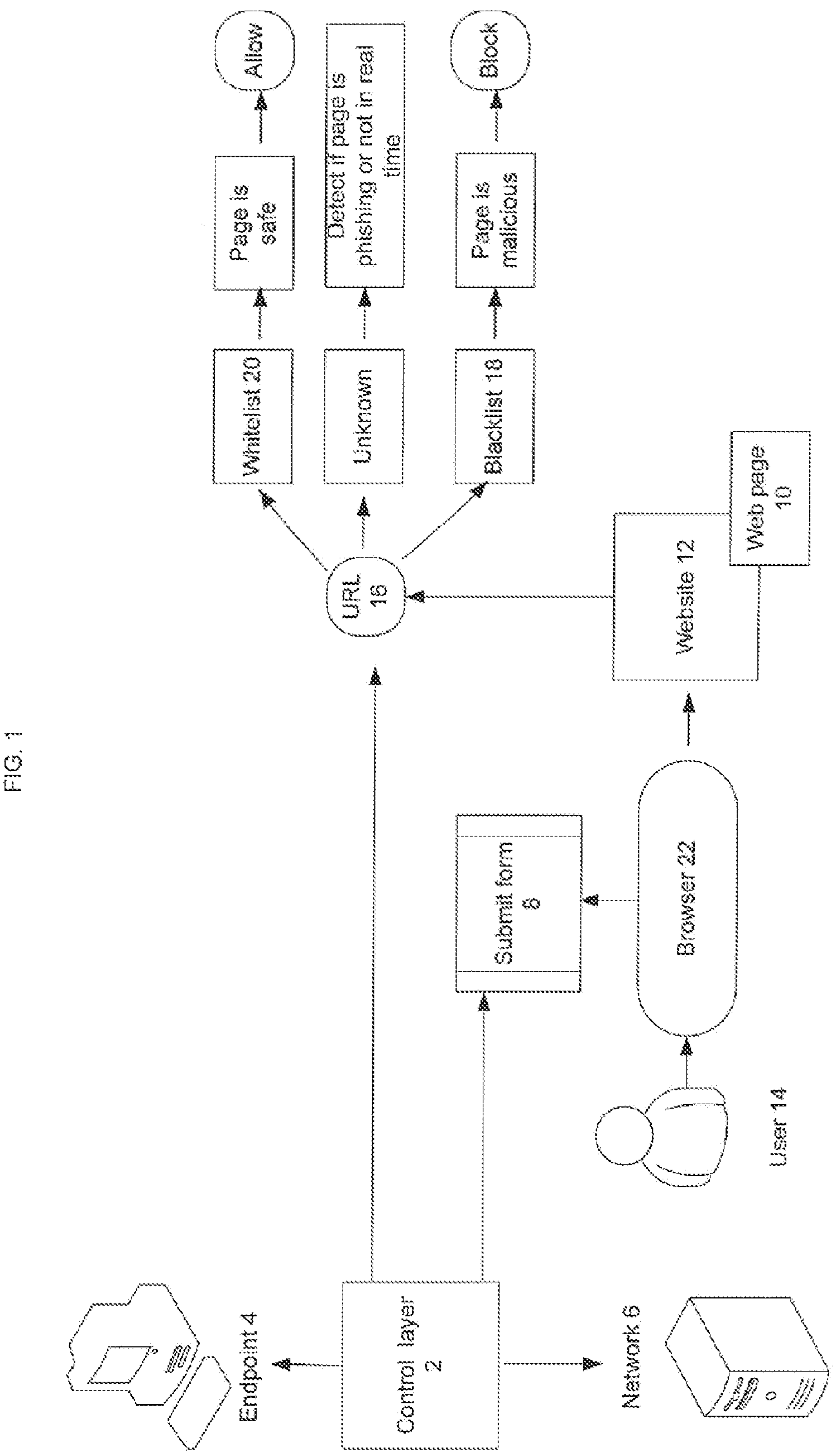
FIG. 1 is a depiction of general scheme of the invention.

FIG. 1 depicts a general scheme of the invention. There is a system of the control layer 2 deployed on endpoint 4 or on network 6 and tracking submit form 8 existence of the web page 10 of web site 12 being visited by users 14. End user 14 browses web pages 10 of web sites 12 and interacts with them, visiting web page URL 16. Further the control layer 2 checks whether URL 16/domain being browsed in either in blacklist 18 or in whitelist 20. If web page 10 is found in whitelist 20 it is safe. If web page 10 is found in blacklist 18, it is malicious. If web page 10 exists neither in whitelist 20 nor in blacklist 18, it is unknown. The control layer 2 may allow interaction of the user 14 with the web site 12 or the control layer 2 may block access to web page content and warn the user 14 about malicious content. Although the user 14 may force continue browsing the web page 10.

FIG. 2 is a flowchart of one embodiment of the invention where initial phishing detection steps are taking place. In step 201 the user 14 visits the website 12 through the browser 22. In step 202 the visited URL 16 is checked within existing blacklist 18 and whitelist 20 of the control layer 2. There are three different possible values for the web page 10 being visited: URL 16 is in whitelist 20, in blacklist 18, URL 16 is neither of the list, thus it is unknown. In step 203 URL16 is found in whitelist, so the website 12 is known, and it is safe. In step 204 the control layer 2 allows the viewing of the webpage 10 and all further interaction. Thus, there is no further involvement of the proposed control layer 2 until the user 14 visits another web page 10. This guarantees that the user 14 is using the safe/known websites 12 and can submit any sensitive data to these websites and perform any activity on them. In step 205 the URL 16 is found in blacklist 18. In step 206 the web page 10 is blocked. In step 207 the user 14 is informed that the web page 10 is malicious/phishing. In step 208 the URL 16 is not listed in either whitelist 20 or blacklist 18 and the web page 10 is still unknown. In step 209 additional phishing detection technique is introduced with the proposed control layer 2.

Figure 3B:
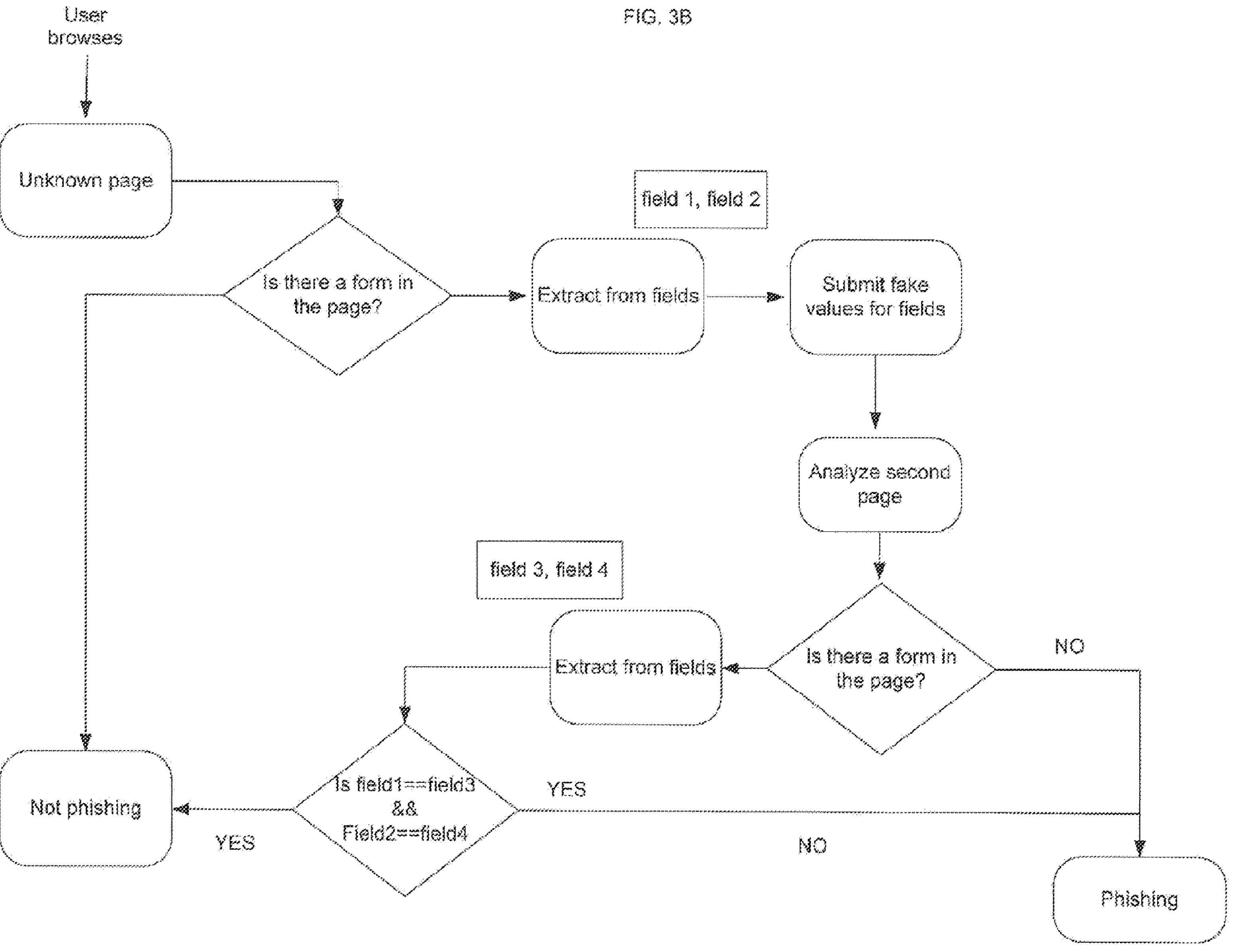
FIG. 3B is a depiction of another embodiment of the invention where the proposed control layer detects whether visited web page is phishing or not in real-time.

FIGS. 3A, 3B, 3C and 3D are flowchart and depictions of another embodiment of the invention where the proposed control layer 2 detects whether the visited web page 10 is phishing or not in real-time. In step 301 the user 14 visits an unknown web page 10 (web page might be safe or malicious). In step 302 the control layer 2 checks if there is a form 8 in the web page 10. The form 8 examples are shown in FIGS. 3C and 3D. In step 303 unknown web page 10 has no input form 8. In step 304 the control layer 2 allows the user 14 to interact with the web page 10 and does not block it. For this case the web page 10 is marked as not phishing. In step 305 the form 8 is found in the web page 10. In step 306 the control layer 2 extracts fields from presented form 8. As illustrated, a first field (field1) and a second field (field2) are extracted. In step 307 random credentials are being generated for a first field (field1) and a second field (field2) and form 8 is submitted in background using these random data. In step 308 a response page retrieved after form 8 submission is being collected and the content of the response is analyzed in background. It is checked whether the response web page of random credentials of submitted form includes any input form or not. In step 309 the response page has no input form 8. In step 310 the control layer 2 marks unknown web page 10 as phishing and blocks it. In step 311 the proposed control layer 2 warns the user 14 about phishing content detection. In step 312 the control layer 2 allows the user 14 to continue using the web site 12 or stop interaction with it. In step 313 the control layer 2 extracts fields from form 8 presented in the response page. In the present invention, a third field (field3) and a fourth field (field4) are extracted. In step 314 the control layer 2 controls whether extracted form fields are the same with initial form 8 fields. In step 315 form 8 has different fields than tan the original form. In step 316 the control layer 2 marks unknown web page 10 as phishing and blocks it. In step 317 the control layer 2 warns the user 14 about phishing content detection. In step 318 the control layer 2 allows the user 14 to continue using the web site 12 or stop interaction with it. In step 319 form 8 has the same fields with the original form. In step 320 the proposed layer 2 allows the user 14 to interact with the web page 10 and does not block it.

The invention is not restricted to the details of the foregoing embodiments. The invention extend to any novel one, or any novel combination, of the features disclosed in this specification (including any accompanying claims, abstract and drawings), or to any novel one, or any novel combination, of the steps of any method or process so disclosed.

What is claimed is:

1. A method to detect a phishing website by introducing a control layer between a user and a website to be visited, where the control layer checks whether said website, requiring sensitive information, is a phishing website by comparing input forms after a false credential submission comprising:

browsing said website where said website has a first input form with username and password input fields asking sensitive information; said control layer is implemented as a web browser extension usable in real time while said user is browsing any website;

checking a whitelist and a blacklist of said control layer to determine if said browsed website is in said whitelist or in said blacklist or is unknown;

recording said input fields;

generating and submitting false credentials for said input fields in background;

enabling a user enabled permissive functionality after said false credentials are sent to said website by warning said user about phishing content detection and allowing said user to continue using said website or stop interaction with said website by having "Allow this website" button after the false credentials have been submitted once;

checking by said control layer content of a response page whether said content of said response page includes said first input form of said website; said response page having a second input form;

checking by said control layer whether said second input form of said response page has the same input fields as the first input form of said website, if said first input form of said website is included;

identifying said website as a phishing site, if said response page does not have said first input form of said website, or if said response page has said first input form of said website with different fields than the first input form of the website; and identifying said website as a phishing site and blocking if said response page has no input form.

2. The method according to claim 1 to detect phishing website by introducing a control layer between a user and a website to be visited, where said control layer triggers interaction with said website and analyzes its behavior before actual interaction with said user.

* * * * *